(12) United States Patent
Lu et al.

(10) Patent No.: US 9,590,547 B2
(45) Date of Patent: Mar. 7, 2017

(54) DOUBLE FED INDUCTION GENERATOR (DFIG) CONVERTER AND METHOD FOR IMPROVED GRID FAULT RIDETHROUGH

(71) Applicant: Rockwell Automation Technologies, Inc., Mayfield Heights, OH (US)

(72) Inventors: Haihui Lu, Shanghai (CN); Zhenhuan Yuan, Shanghai (CN); Lixiang Wei, Mequon, WI (US); Russel J. Kerkman, Milwaukee, WI (US); Richard Lukaszewski, New Berlin, WI (US); Ahmed Mohamed Sayed Anmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/696,648

(22) Filed: Apr. 27, 2015

(65) Prior Publication Data
US 2015/0229257 A1  Aug. 13, 2015

Related U.S. Application Data

(62) Division of application No. 13/430,504, filed on Mar. 26, 2012, now Pat. No. 9,041,234.

(51) Int. Cl.
*F03D 9/00* (2016.01)
*H02P 9/00* (2006.01)
(Continued)

(52) U.S. Cl.
CPC ............ *H02P 9/006* (2013.01); *F03D 7/0224* (2013.01); *F03D 7/04* (2013.01); *F03D 9/003* (2013.01);
(Continued)

(58) Field of Classification Search
CPC ...... H02P 9/007; H02P 2101/15; H02J 3/386; F03D 7/04; H02H 7/06
(Continued)

(56) References Cited

U.S. PATENT DOCUMENTS

| 3,757,197 A | 9/1973 | Bailey |
| 4,276,589 A | 6/1981 | Okawa et al. |

(Continued)

FOREIGN PATENT DOCUMENTS

| CN | 1823467 A | 8/2006 |
| CN | 101383576 A | 3/2009 |

(Continued)

OTHER PUBLICATIONS

English Translation of Chinese Office Action, CN 201310100331.8, Dated Apr. 23, 2015, Mailed May 4, 2015.

*Primary Examiner* — Julio C. Gonzalez Ramirez
(74) *Attorney, Agent, or Firm* — Fay Sharpe LLP

(57) ABSTRACT

A double fed induction generator (DFIG) converter, methods and computer readable mediums are presented in which rotor side current spikes are attenuated by selectively activating at least one series damping circuit to conduct current through a series damping circuit resistance coupled in series between one or more DFIG rotor leads and a grid side converter in response to a grid fault occurrence or a grid fault clearance, and selectively bypassing the series damping circuit resistance after activating the series damping circuit.

18 Claims, 7 Drawing Sheets

(51) Int. Cl.

| | | |
|---|---|---|
| *F03D 7/02* | (2006.01) | |
| *F03D 7/04* | (2006.01) | |
| *H02J 3/38* | (2006.01) | |
| *H02P 9/10* | (2006.01) | |
| *H02H 7/06* | (2006.01) | |
| *H02H 7/12* | (2006.01) | |
| *H02P 101/15* | (2015.01) | |
| *H02H 9/00* | (2006.01) | |
| *H02J 3/00* | (2006.01) | |

(52) U.S. Cl.
CPC ............... *H02H 7/06* (2013.01); *H02H 7/12* (2013.01); *H02J 3/386* (2013.01); *H02P 9/007* (2013.01); *H02P 9/102* (2013.01); *H02H 9/002* (2013.01); *H02J 2003/001* (2013.01); *H02P 2101/15* (2015.01); *Y02E 10/723* (2013.01); *Y02E 10/763* (2013.01)

(58) Field of Classification Search
USPC .... 322/21, 44, 49; 290/44, 55; 700/287, 286
See application file for complete search history.

(56) References Cited

U.S. PATENT DOCUMENTS

| | | | |
|---|---|---|---|
| 4,434,376 A * | 2/1984 | Hingorani | ............. H02J 3/1807 307/102 |
| 4,496,899 A | 1/1985 | Lippitt et al. | |
| 4,545,002 A | 10/1985 | Walker | |
| 4,833,389 A | 5/1989 | Kovalsky et al. | |
| 4,870,338 A | 9/1989 | Abbondanti | |
| 5,005,115 A | 4/1991 | Schauder | |
| 5,041,959 A | 8/1991 | Walker | |
| 5,883,775 A | 3/1999 | Maytum | |
| 6,275,391 B1 | 8/2001 | Laskai et al. | |
| 7,102,247 B2 | 9/2006 | Feddersen | |
| 7,164,562 B2 | 1/2007 | Virtanen | |
| 7,253,537 B2 * | 8/2007 | Weng | ...................... H02P 9/006 290/44 |
| 7,411,309 B2 | 8/2008 | Hudson | |
| 7,423,412 B2 | 9/2008 | Weng et al. | |
| 7,514,907 B2 | 4/2009 | Rajda et al. | |
| 7,518,256 B2 | 4/2009 | Juanarena Saragueta et al. | |
| 7,622,815 B2 | 11/2009 | Rivas et al. | |
| 7,868,581 B2 | 1/2011 | Qian et al. | |
| 7,939,954 B2 | 5/2011 | Ruiz Flores et al. | |
| 8,030,791 B2 | 10/2011 | Lang et al. | |
| 8,350,397 B2 | 1/2013 | Lang et al. | |
| 8,570,003 B2 | 10/2013 | Lu et al. | |
| 2006/0192522 A1 | 8/2006 | Kerkman et al. | |
| 2006/0232250 A1 | 10/2006 | Sihler et al. | |
| 2007/0177314 A1 * | 8/2007 | Weng | ...................... F03D 9/003 361/20 |
| 2007/0216337 A1 | 9/2007 | Lu et al. | |
| 2007/0268051 A1 | 11/2007 | Kerkman et al. | |
| 2008/0067970 A1 | 3/2008 | Qian et al. | |
| 2008/0067971 A1 | 3/2008 | Qian et al. | |
| 2008/0203954 A1 | 8/2008 | Qian et al. | |
| 2009/0058341 A1 | 3/2009 | Lu et al. | |
| 2010/0025995 A1 * | 2/2010 | Lang | ................... H02M 5/4505 290/44 |
| 2012/0022714 A1 * | 1/2012 | Sng | ......................... H02J 3/386 700/298 |
| 2013/0313826 A1 | 11/2013 | Gupta et al. | |

FOREIGN PATENT DOCUMENTS

| | | |
|---|---|---|
| CN | 102214931 A | 10/2011 |
| EP | 1965075 A1 | 9/2008 |
| WO | WO2004091085 A1 | 10/2004 |

\* cited by examiner

DOUBLE FED INDUCTION GENERATOR (DFIG) CONVERTER AND METHOD FOR IMPROVED GRID FAULT RIDETHROUGH

REFERENCE TO RELATED APPLICATION

This application is a divisional of, and claims priority to and the benefit of, U.S. patent application Ser. No. 13/430,504, filed on Mar. 26, 2012, entitled DOUBLE FED INDUCTION GENERATOR (DFIG) CONVERTER AND METHOD FOR IMPROVED GRID FAULT RIDE-THROUGH, the entirety of which application is hereby incorporated by reference.

BACKGROUND

Double fed induction generators (DFIGs) are commonly used in wind energy conversion systems (WECs) for interfacing a wind-driven turbine with an electrical power grid. Wind energy systems are gaining popularity for power generation as a form of "green technology" that does not consume fossil fuels, but instead converts wind-generated power for provision to electrical power distribution grids. DFIG-based converters adapt mechanical power generated by wind turbines to AC electric power in a form compatible with the grid, typically including a rotor driven by a turbine through a gearbox to supply power to a grid via stator connections. The DFIG rotor windings are connected to a back-to-back converter that includes a rotor side converter connected between the rotor windings and a DC circuit, along with a grid side converter connected between the DC circuit and the grid.

The DFIG system provides power from the DFIG stator windings to the grid with the DFIG rotor frequency often deviating from a nominal value corresponding to the grid frequency. DFIG converters essentially operate in one of two modes, depending on the rotating speed of the rotor. For rotor speeds below the nominal rotational speed, some of the stator power is fed to the rotor via the converters, with the grid side converter stage operating as a rectifier to supply power to the intermediate circuit and the rotor side converter inverting the DC power to power the rotor windings. When the rotor speed is above the nominal value, rotor currents are used to power the intermediate circuit, and the grid side converter operates as an inverter to supply power to the grid.

The DFIG converter can also control the rotor currents to adjust the active and reactive power fed to the grid from the stator independently of the rotor speed, and the DFIG generator is able to both import and export reactive power. This capability advantageously allows the DFIG system to support the grid during severe voltage disturbances (e.g., grid voltage sag conditions). The DFIG architecture also allows the DFIG to remain synchronized with the grid while the wind turbine speed changes, where variable speed wind turbines use the energy of the wind more efficiently than fixed speed turbines. The DFIG generator is typically constructed with significantly more rotor windings than stator windings such that the rotor currents are lower than the stator currents. Consequently, a relatively small back-to-back converter can be used, having components sized for operation within a certain rotor speed range.

However, transient DFIG rotor voltages upon grid faults are higher than the stator and grid voltages, and thus the rotor side converter and the intermediate DC circuit are particularly susceptible to voltage transients caused by grid disturbances such as grid voltage sag fault occurrences and clearance of these faults. Also, DFIG converters are typically subject to high current peaks upon the occurrence and clearance of grid faults, where current spikes on the rotor windings may exceed three times the rated value, depending on the leakage inductance and rotor resistance, and may trigger hardware over-current and/or overvoltage protection circuits to trip the converter. In particular, high current can flow through anti-parallel diodes in the rotor side converter even when the corresponding rotor side switching devices are off. If this happens, the DFIG system is not controlled during the critical time of grid faults, and thus the system cannot support the grid.

Previous attempts to address DFIG grid fault ride through issues included use of AC crowbar circuits on the rotor side to shunt current away from the rotor side converter during grid faults, but if the crowbar resistance is too low, current peaks on the rotor side may still be excessive. Moreover, if the crowbar resistance is too high, transient voltages can still charge the DC bus resulting in high charging current flowing through the anti-parallel (free-wheeling) diodes of the rotor side converter even if the corresponding converter switching devices are off. Other attempts involve insertion of damping resistance in series with DFIG stator windings, which can shorten the duration of the transient, but has little effect on reducing rotor side current peaks. Consequently, a need remains for improved DFIG converters and techniques to avoid or mitigate loss of DFIG system control for ride through of grid faults, particularly for low voltage ride through (LVRT).

SUMMARY

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter.

The present disclosure involves the use of series-connected damping resistances as well as bypass switching devices coupled with a DFIG rotor side converter, by which current peaks at both the rotor side and stator side can be advantageously reduced. This, in turn, facilitates continued control of the DFIG converter and avoidance or mitigation of damage to the rotor side converter components during grid faults including grid voltage sag conditions. Furthermore, the disclosed DFIG converter grid fault ride through apparatus and techniques can be adapted according to sensed DFIG system currents or other operating conditions to provide improved response to grid fault occurrences and clearances.

In accordance with one or more aspects of the present disclosure, power conversion systems are disclosed for operation with double fed induction generators (DFIGs), which include a rotor side converter, a grid side converter, a series damping apparatus, and a damping controller. The damping apparatus in certain embodiments is coupled between the DFIG rotor leads and the rotor side converter for damping of AC rotor currents. In other embodiments, the damping apparatus is coupled in series between the rotor side and grid side converters for damping intermediate DC currents that would otherwise charge the DC link capacitance. The series damping apparatus includes one or more series damping circuits with a series damping circuit resistance and a series damping switching circuit coupled in parallel with one another. In a first (e.g., normal) mode, the switching circuit is closed or conductive to bypass the damping resistance and thus prevent current flow through the damping resistance. In a second (e.g., damping) mode, the damping apparatus switching device opens to allow current flow through the damping resistance. The damping controller sets the operating mode of the series damping switching circuit based in whole or in part on a grid fall occurrence or on a grid fault clearance.

In certain embodiments, a damping circuit is connected in series with each or at least with two of the AC rotor lines. Where such AC damping is used, the series damping switching circuit is bidirectional to allow flow of current in both directions during normal operation. In other embodiments, DC damping is performed using one or more damping circuits connected in the positive and/or the negative DC bus lines at the DC side of the rotor side converter. In such embodiments, the series damping switching circuit can be bidirectional.

In certain embodiments, moreover, the damping controller provides damping control signal to set the damping switching circuit or circuits to the damping mode for a fixed damping time period in response to a fault occurrence or clearance. In other embodiments, the damping controller discontinues the damping operation based in whole or in part on a monitored DFIG system operating parameter. For instance, the controller may set the damping switching circuit back to the normal mode once a stator or rotor current drops below a predetermined threshold value.

In accordance with further aspects of the disclosure, a method is provided for operating a DFIG converter, which includes activating one or more series damping circuits to conduct current through a series damping resistor coupled in series between the DFIG rotor and the rotor side converter, or coupled in the intermediate DC link circuit, in response to a grid fault occurrence or to a grid fault clearance. The method further includes selectively bypassing the series damping resistor following activation of the series damping circuit. In certain embodiments, one or more DFIG operating conditions are monitored and the time period between activation and bypassing is adjusted based at least partially on the monitored operating condition.

Further aspects of the disclosure involve computer readable mediums having computer executable instructions for operating a DFIG converter.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Figure 1:
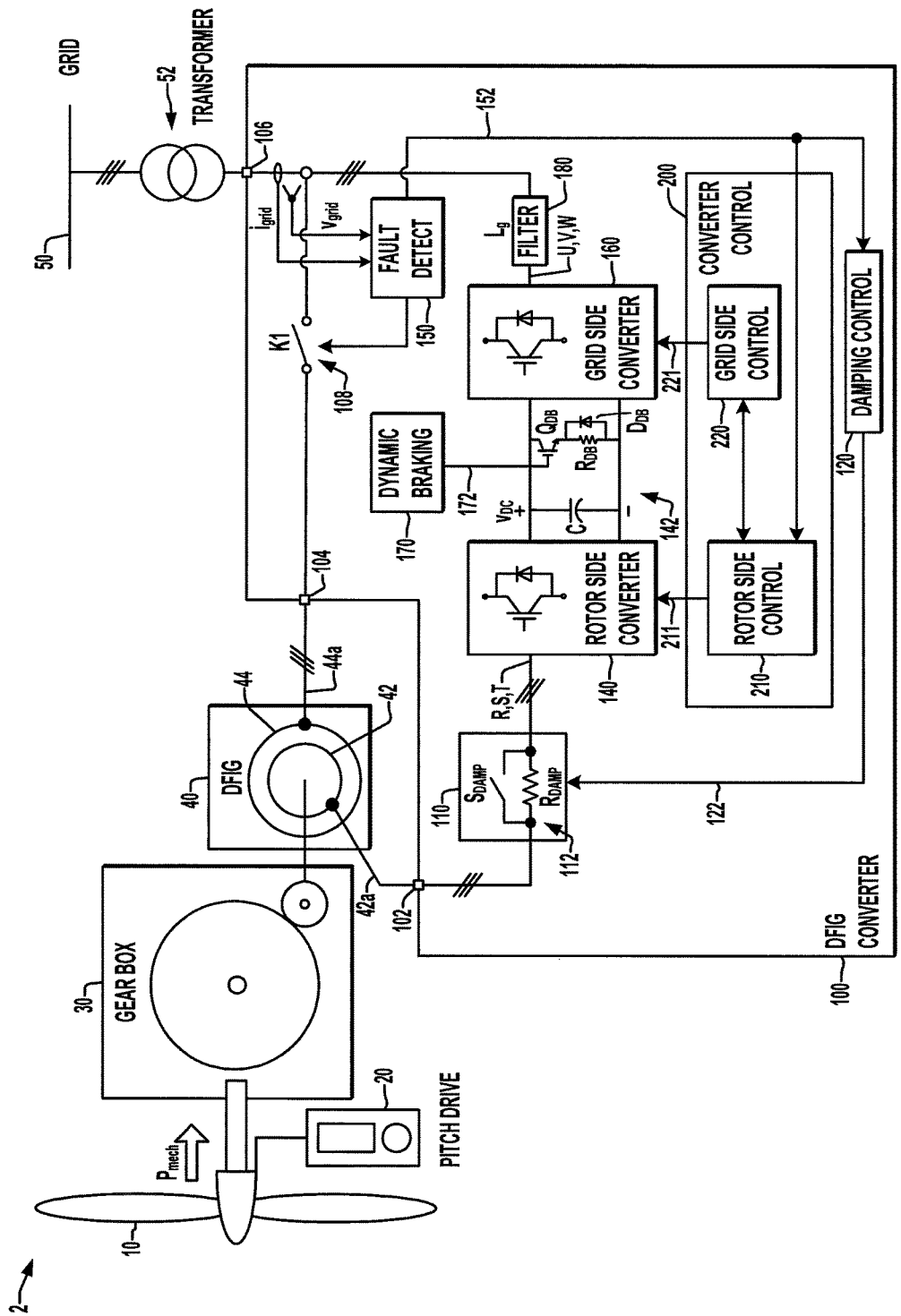
FIG. 1 is a schematic diagram illustrating an exemplary wind energy system with a DFIG converter having a series damping circuit coupled with the DFIG rotor windings as well as a damping controller for grid fault ride through in accordance with one or more aspects of the present disclosure.

Referring now to the figures, several embodiments or implementations of the present invention are hereinafter described in conjunction with the drawings, wherein like reference numerals are used to refer to like elements throughout, and wherein the various features are not necessarily drawn to scale. The present disclosure provides techniques and apparatus for selectively damping rotor side currents in response to the occurrence and/or clearance of grid fault conditions in double fed induction generator (DFIG) systems. These concepts find utility in any application of DFIG technology, including without limitation wind energy systems and may be advantageously employed to facilitate use of a DFIG system to support a power grid during fault conditions. In addition, the techniques and apparatus of the present disclosure may be utilized in connection with a variety of grid fault types. In particular, so-called voltage sag type grid faults can be ameliorated by a connected DFIG system selectively adjusting active and reactive power provided to (or removed from) the grid in a controlled fashion. However, it will be appreciated that the systems and methods disclosed herein can be used for DFIG converter system operation during any type of grid fault, and the apparatus and techniques are not limited by the specific applications illustrated and described hereinafter.

Figure 2:
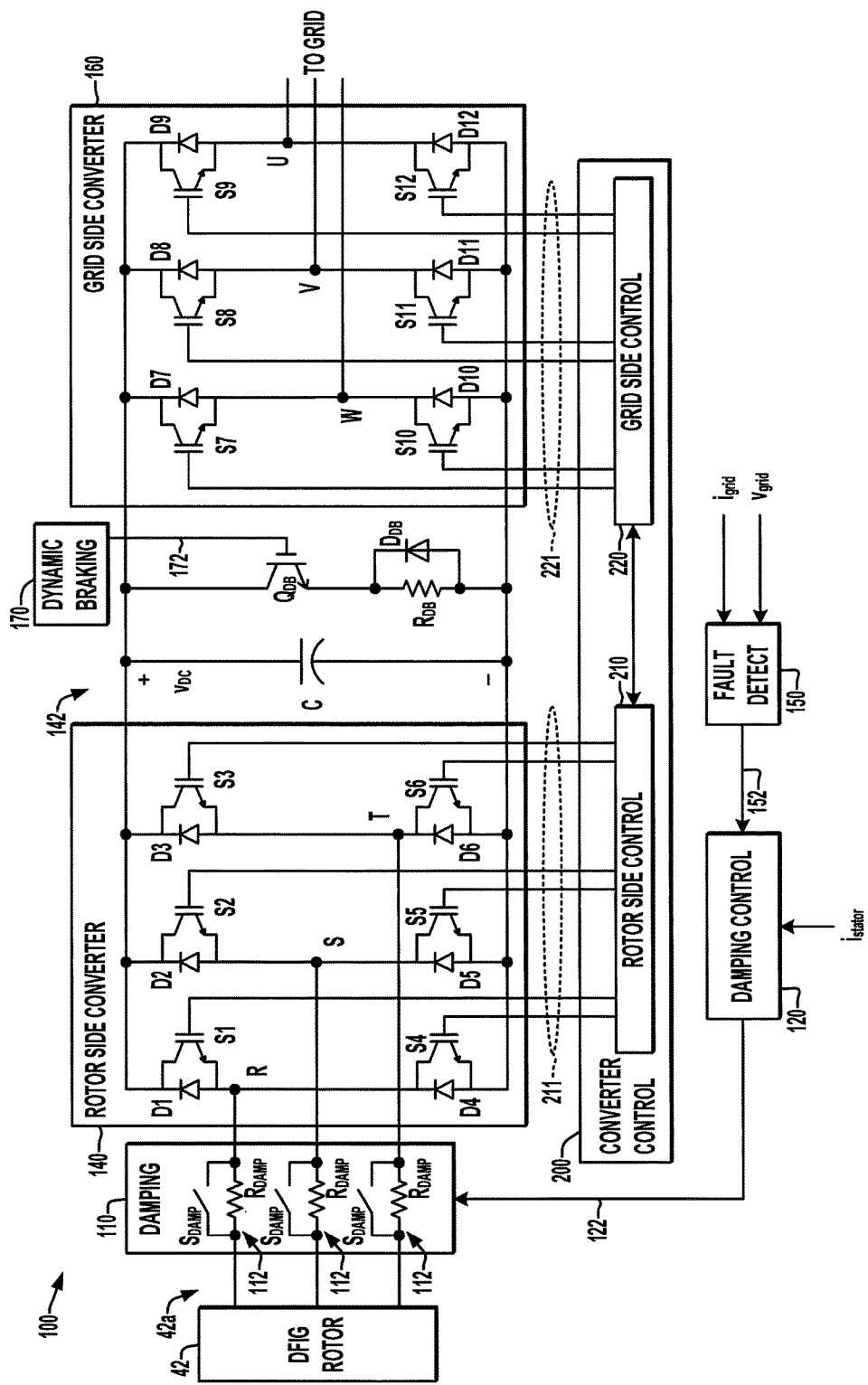
FIG. 2 is a schematic diagram illustrating further details of a back-to-back DFIG converter and damping control system for grid fault ride through in the system of FIG. 1.

An exemplary wind energy converter (WEC) or wind energy system (WES) 2 is illustrated in FIGS. 1 and 2, including a double fed induction generator (DFIG) conversion system which includes a DFIG 40 and associated mechanical drive components as well as a DFIG converter 100 in accordance with various aspects of the present disclosure. The illustrated system 2 includes a turbine 10 with a pitch drive 20 providing rotational mechanical power $P_{mech}$ to drive a gear box 30 with an output shaft mechanically coupled to a rotor 42 of the DFIG 40. The DFIG rotor windings 42a (single or multi-phase) transfer AC power between the rotor 42 and a back-to-back DFIG converter 100 via a rotor connection 102. The DFIG 40 has a stator 44 with windings 44a coupled to an AC grid 50 through a circuit breaker 108 (K1) of the DFIG converter 100 and a transformer 52, although the breaker 108 may be omitted in certain embodiments. The DFIG 40 is coupled to the DFIG converter 100 via a rotor connection 102 and a stator connection 104 including electrical connections coupleable to the rotor and stator leads 42a and 44a, respectively. The converter 100 also includes a grid connection 106 and may, but need not, include the transformer 52. In the illustrated embodiments, an internal connection is provided between the transformer lines at the grid connection 106, the circuit breaker 108 and a converter output filter 180 formed by line inductors $L_g$ or an LCL filter. In certain embodiments, the filter 180 may be omitted, or filter components may be provided external to the DFIG converter 100.

The converter 100 is a back-to-back structure with a rotor side converter circuit 140 having three AC phase terminals R, S and T coupled between the rotor connection 102 and a DC intermediate circuit 142 providing a DC bus with a capacitance C. The illustrated converter 100 also includes a dynamic braking circuit coupled across the intermediate DC bus 142 in parallel with the bus capacitance C, including a transistor $Q_{DB}$ and a resistor $R_{DB}$ connected in series across the DC bus, with a diode $D_{DB}$ in parallel with the resistor $R_{DB}$. The transistor $Q_{DB}$ has a gate terminal controlled by a dynamic braking signal 172 from a dynamic braking controller 170, which can be part of the converter controller 200 in certain embodiments. When the dynamic braking transistor $Q_{DB}$ is in the on (conductive) state, the resistor $R_{DB}$ is connected in parallel with the DC bus capacitance C to selectively dissipate power within the converter 100.

Figure 4:
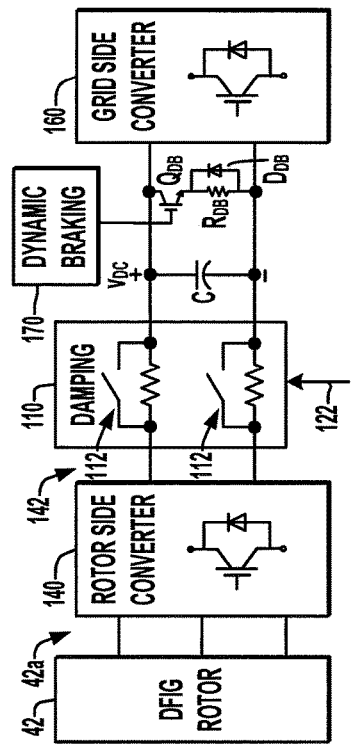
FIG. 4 is a schematic diagram illustrating still another exemplary series damping circuit with damping resistors and corresponding switches coupled in positive and negative DC bus lines between the rotor side converter and the grid side converter.
Figure 5:
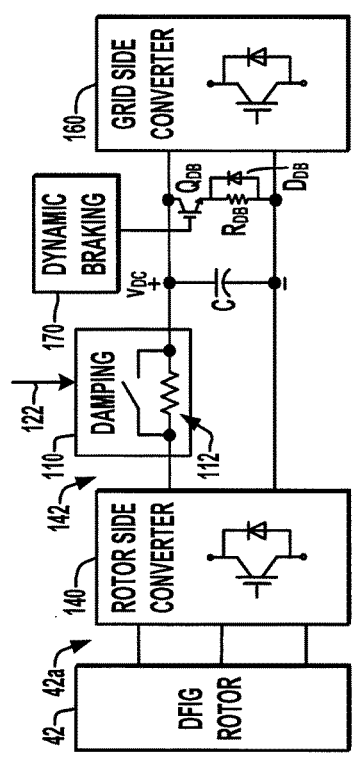
FIG. 5 is a schematic diagram illustrating another exemplary damping circuit with a damping resistor and associated switch connected in a single one of the DC bus lines.

In the embodiment illustrated in FIGS. 1 and 2, moreover, a series damping apparatus 110 is connected in series with each of the rotor connections 102 (3-phase in one example), although the damping apparatus 110 may alternatively or in combination be connected in the DC intermediate circuit 142 as seen in FIGS. 4 and 5 below. As further shown in FIG. 2, the rotor side converter 140 provides a three-phase rectifier circuit including anti-parallel (e.g., free-wheeling) diodes D1-D6 along with a rotor side switching circuit comprised of corresponding switching devices S1-S6 (e.g., IGBTs or other suitable switching devices) coupled between the AC connections R, S and T and the DC bus terminals of the intermediate circuit 142.

The DFIG converter 100 also includes a grid side converter circuit 160 having AC terminals U, V and W coupled with the stator connection 104 via the filter 180. In addition, the grid side converter 160 is coupled with the DC circuit 142, and includes a grid side rectifier circuit with anti-parallel rectifier diodes D7-D12 individually associated with switching devices S7-S12 (e.g., IGBTs or other suitable switching devices) of a grid side switching circuit.

The DFIG converter 100 operates in one of two modes during normal operation, with the rotor side converter circuit 140 providing power from the rotor connection 102 to the DC circuit 142 in a first mode and providing power from the DC circuit 142 to the rotor connection 102 in a second mode, with the switches S1-S6 being operated as a switching inverter. In the first mode, moreover, the grid side converter circuit 160 operates as an inverter to provide power from the DC circuit 142 to the stator connection 104 via switches S7-S12. In the second mode, the grid side converter 160 rectifies power from the stator connection 104 to charge the DC circuit 142 using the rectifiers D7-D12. The IGBTs S7-S12 and the anti-parallel diodes D7-D12 thus work together to allow bidirectional power flow in grid side converter 160. Likewise, the rotor side switches S1-S6 and corresponding diodes D1-D6 allow bidirectional flow in the rotor side converter 140.

The operational mode of the illustrated converter 100 is set in normal operation according to the rotor speed, with current from the rotor windings 42a being used in the first mode to power the intermediate circuit 42 and the grid side converter operating as an inverter to supply power to the grid when the rotor speed is above the nominal value corresponding to the grid frequency. For rotor speeds below the nominal rotational speed, a portion of the stator power is fed to the rotor 42 via the converter circuits 140, 160 operating in the second mode, with the grid side circuit 160 operating as a rectifier to supply power to the intermediate circuit 42 and the rotor side circuit 140 inverting the DC power provided to the rotor windings 42a.

As seen in FIGS. 1 and 2, a series damping apparatus 110 is provided in the DFIG converter 100, which is coupled in series between the rotor leads 42a and the rotor side converter 140. In the illustrated embodiment, the damping apparatus 110 is connected between the rotor connection 102 and the AC connections R, S, T of the rotor side converter 140, but other embodiments are possible in which a series damping apparatus 110 is provided in the DC intermediate circuit 142 between the rotor side converter 140 and the grid side converter 160 (e.g., FIGS. 4 and 5 below). In the various AC damping embodiments of FIGS. 1-3, the damping apparatus 110 includes one or more series damping circuits 112 that individually include a series damping circuit resistance $R_{DAMP}$ coupled in series between one of the rotor leads 42a and a corresponding one of the AC connections R, S, T of the rotor side converter 140, along with a bidirectional series damping switching circuit $S_{DAMP}$ coupled in parallel with the series damping circuit resistance $R_{DAMP}$.

In operation, the series damping switching circuit $S_{DAMP}$ is operated according to a damping control signal 122 from a damping controller 120 in order to bypass the series damping circuit resistance $R_{DAMP}$ and thereby to prevent current flow in the series damping circuit resistance $R_{DAMP}$ in a first mode. As seen by the parallel connection of the switching circuit $S_{DAMP}$ and the resistance $R_{DAMP}$, the switching circuit $S_{DAMP}$ provides a low impedance in this operating mode. In a second mode, the series damping switching circuit $S_{DAMP}$ presents a high impedance path to allow current to flow in the series damping circuit resistance $R_{DAMP}$.

Figure 7:
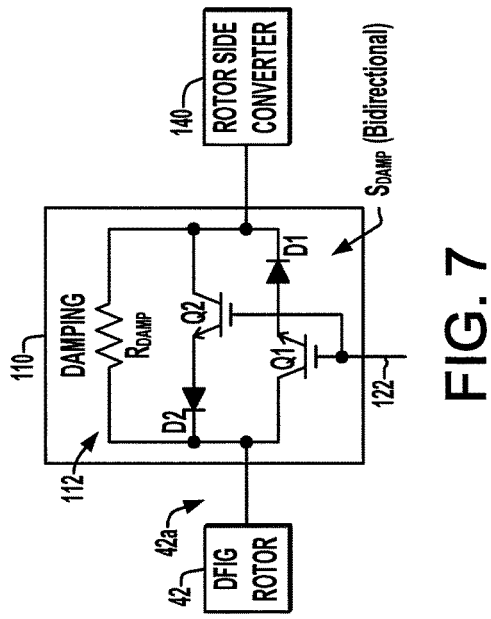
FIG. 7 is a schematic diagram illustrating another exemplary bidirectional switching device including a pair of IGBTs and associated diodes coupled in anti-parallel for AC damping between the DFIG rotor and the rotor side converter.
Figure 6:
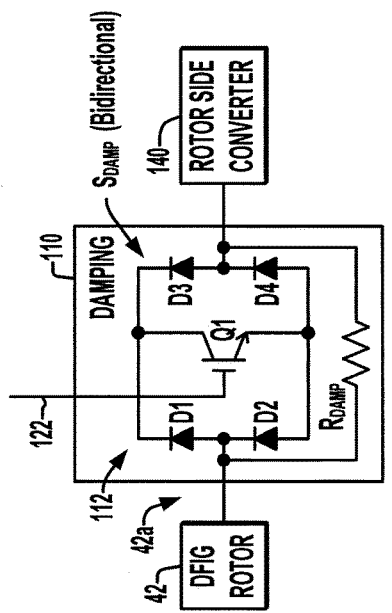
FIG. 6 is a schematic diagram illustrating an exemplary bidirectional switching device in the series damping circuit including a single IGBT and four diodes for selective damping of an AC connection between the DFIG rotor and the rotor side converter.

Referring also to FIGS. 6 and 7, any suitable series damping circuit resistance $R_{DAMP}$ and series damping switching circuit $S_{DAMP}$ may be used, where the switching circuit $S_{DAMP}$ is preferably bidirectional when in the first mode so as to allow flow of AC current in both directions between the DFIG rotor 42 and the rotor side converter 140. In practice, the damping resistance $R_{DAMP}$ can be selected based on the parameters of the DFIG converter 100. In particular, the rotor side current spike associated with occurrences or clearances of grid faults depends at least in part on the total leakage inductance and dynamic impedance of the DFIG converter 100. In certain embodiments, the total leakage inductance can be estimated as approximately 5% of the mutual inductance. If it is desired to reduce the current spike by 50%, therefore, the damping resistance $R_{DAMP}$ can be selected as having a value approximately equal to the estimated leakagereactance. The total machine impedance can be estimated as the sum of the rotor resistance and the stator resistance. This total machine impedance can be summed with the estimated leakagereactance, and the summation provides an estimate of the necessary damping resistance $R_{DAMP}$ which can be used to reduce the rotor side current spikes by 50%.

FIG. 6 illustrates a first bidirectional embodiment of the switching circuit $S_{DAMP}$ including a semiconductor-based switching device Q1, which can be any suitable switching device operable according to a switching control signal 122 from the damping controller 120 (FIG. 1), including without limitation an IGBT as shown in FIG. 6. Also included in the circuit $S_{DAMP}$ are four diodes D1-D4, and the switching circuit $S_{DAMP}$ is connected in parallel with the damping resistance $R_{DAMP}$. In the first mode, the switching device Q1 is on (low impedance between the collector and emitter), thus allowing current to flow from the DFIG rotor 42 through diode D1, then through the transistor Q1, and then through diode D4 to the rotor side converter 140. The circuit $S_{DAMP}$ of FIG. 6 is bidirectional, and thus in the first mode current may flow in the reverse direction from the rotor side converter 140 through the diode D3, then through the transistor Q1, and then through the diode D2 to the DFIG rotor 42. Thus, the presentation of this low impedance path bypasses the damping resistance $R_{DAMP}$ through which no AC current flows. In the second mode, the transistor Q1 this off (high impedance between the collector and emitter), and the configuration of the diodes D1-D4 prevents current flow through the circuit $S_{DAMP}$, and thus current flowing between the DFIG rotor 42 and the rotor side converter 140 flows through the damping resistance $R_{DAMP}$.

FIG. 7 illustrates another bidirectional switching circuit embodiment $S_{DAMP}$ including a pair of transistors Q1 and Q2 (e.g., IGBTs in one non-limiting example) with control terminals connected to the damping control signal 122, as well as two diodes D1 and D2. As seen in the figure, each transistor is connected in series with one of the diodes with the emitter coupled to the anode of the diode in order to provide a conductive path in the first mode from the transistor collector to the cathode of the diode. Each transistor and diode series circuit thus forms a conductive path in one direction when the corresponding transistor is in the low impedance (on) state. Moreover, the switching circuit $S_{DAMP}$ includes two such circuit branches, connected in anti-parallel relation to one another, with the cathode of the first diode D1 connected to the rotor side converter 140 and the cathode of the diode D2 connected to the DFIG rotor 42. This pair of anti-parallel circuit branches is connected in parallel with the damping resistance $S_{DAMP}$. In the first mode, the damping control signal 122 turns both the transistors Q1 and Q2 on (low emitter-collector impedance), whereby current can flow from the DFIG rotor 42 through the rotor side converter 140 through transistor Q1 and diode D1 or can flow from the rotor side converter 140 toward the DFIG rotor 42 through transistor Q2 and diode D2, thereby bypassing the damping resistance $S_{DAMP}$. In the second mode, however, both transistors Q1 and Q2 are off (high impedance), whereby current will flow in either direction between the DFIG rotor 42 and the rotor side converter 140 through the damping resistance $R_{DAMP}$.

Referring again to FIGS. 1 and 2, the damping controller 120 sets the mode of the series damping switching circuit $S_{DAMP}$ based at least partially on a detected or anticipated grid fault occurrence or a grid fault clearance. In the illustrated embodiments, the damping controller 120 provides one or more damping control signals 122 to the series damping apparatus 110 in the switching circuit $S_{DAMP}$ thereof. The controller 120 can set the switching circuit mode by any suitable form of one or more signals or messages, such as electrical signaling suitable for establishing a base emitter voltage for the IGBT switching devices in the illustrated examples, or other suitable switching control signals 122. In other embodiments, the controller 120 can send one or more messages to achieve the desired switching action by the series damping switching circuit $S_{DAMP}$. The controller 120 can be any suitable hardware, processor-executed software, programmable logic, circuitry, or combinations thereof. In one possible embodiment, the damping controller 120 may be implemented in a processor-based converter control 200 which also operates the switching operation of the rotor side converter 140 and/or the grid side converter 160.

As seen in FIGS. 1 and 2, moreover, the damping controller 120 in certain embodiments receives a fault detect signal 152 from a fault detect component 150, and may also receive one or more feedback signals or values from one or more system sensors (not shown), and other information, data, etc., which may be in any suitable form such as an electrical signal, digital data, etc., and which may be received from any suitable source, such as an external network, switches, a user interface associated with the system 100 (not shown), or other suitable source(s). In one possible implementation, the fault detect component 150 monitors one or both of the grid current $i_{grid}$ and/or the grid voltage $V_{grid}$ from suitable feedback sensors or systems, and selectively provides a signal 152 indicating that a grid fault has been detected by the DFIG converter 100. In one non-limiting example, the fault detector 150 provides the signal 152 indicating to the damping controller 120 that the grid voltage $V_{grid}$ has dropped below a predetermined threshold value, thus indicating a low-voltage grid fault has occurred. In addition, the fault detector 150 may provide the signal 152 so as to indicate to the damping controller 120 that a previously detected grid fault has been cleared, such as by the detection that the grid voltage $V_{grid}$ has risen above the same or a different predetermined threshold. In other embodiments, the fault detection may be provided as a message 152 from the fault detector 150 to the damping controller 120.

Based in whole or in part on this fault detection signal or message 152, the damping controller 120 provides the damping control signal 122 to the series damping apparatus 110 for selectively bypassing the damping resistance $R_{DAMP}$ or allowing current flow through the damping resistance $R_{DAMP}$. In addition, as discussed further below, the damping controller 120, in response to detection of a fault occurrence or clearance as indicated by the signal 152 from the fault detector 150, may actuate the damping control signal 122 in order to place the switching device or devices of the damping apparatus 110 in the second mode for a predetermined time $T_{DAMP}$, after which the signal 122 is changed in order to place the series damping apparatus 110 back into the first mode.

In certain embodiments, moreover, the damping controller 120 may selectively change the status of the damping control signal 122 in order to place the damping apparatus 110 back in the first mode based at least partially on one or more monitored DFIG converter operating conditions. For instance, the damping controller 120 may monitor the stator current or voltage, or the rotor current or voltage, and selectively switch the damping state back to the first mode based on one or more of these monitored conditions. In one example, the damping controller 120 monitors the stator current $i_{stator}$ after a fault occurrence or clearance has been detected, and switches the damping apparatus 110 back to the first mode once the stator current has dropped below a predetermined threshold level. In this manner, the controller 120 can selectively adjust the time period during which the series damping apparatus 120 remains in the damping mode.

As seen in FIGS. 1 and 2, the DFIG converter 100 also includes a converter control system 200 with a rotor side control component 210 and a grid side control component 220, and the damping controller 120 may be implemented as part of the converter control system 200 or may be separately implemented as shown in FIGS. 1 and 2. In certain implementations, the control system 200 may have inputs for receiving the fault detect signal 152, feedback signals or values from one or more system sensors (not shown), and other information, data, etc., which may be in any suitable form such as an electrical signal, digital data, etc., and which may be received from any suitable source, such as an external network, switches, a user interface associated with the system 100 (not shown), or other suitable source(s). The control system 200 and the components thereof may be any suitable form of hardware, processor-executed software, processor-executed firmware, logic, or combinations thereof that are adapted to implement the functions illustrated and described herein. In operation, the control system 200 operates the back-to-back converter stages 140 and 160 by providing control signals or values, with the rotor side control component 210 providing rotor switching control signals 211 to operate the rotor side converter switches S1-S6 and the grid side control component 220 providing switching control signals 221 to the switches S7-S12 of the grid side converter stage 160 for the associated power conversion functions thereof.

Figure 3:
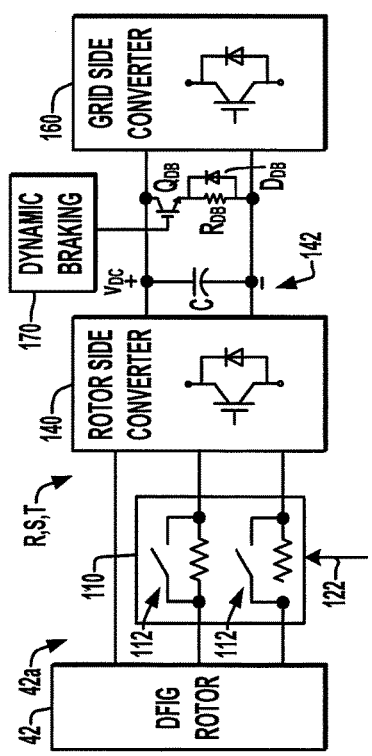
FIG. 3 is a schematic diagram illustrating another exemplary series damping circuit with damping resistors and associated switches connected between the DFIG rotor and the rotor side converter in two of three rotor lines.

As seen in FIG. 3, certain embodiments employing the series damping apparatus 110 in the AC path between the rotor 42 and the rotor side converter 140 can include a damping resistance $R_{DAMP}$ in fewer than all of the rotor lines. The example of FIG. 3 is a three-phase case in which a damping resistance $R_{DAMP}$ is provided in two of the three rotor phases (e.g., phases "S" and "T"), while no damping resistance is provided in the first phase "R". In preferred embodiments, a damping resistance $R_{DAMP}$ is provided in at least two of the AC rotor phase lines in the three-phase situation. Moreover, in a single phase case, a single damping resistance $R_{DAMP}$ can be provided in either of the phase lines of the DFIG rotor 42.

FIG. 4 illustrates an embodiment using selective DC damping in which the damping apparatus 110 includes damping circuits 112 coupled in both positive and negative DC bus lines of the intermediate circuit 142 between the rotor side converter 140 and the grid side converter 160. In this embodiment, moreover, the series damping apparatus 110 is positioned between the DC connections of the rotor side converter 140 and the bus capacitance C to damp current flowing between the rotor side converter 140 and the DC bus capacitance C. In these embodiments, the damping circuit switching devices $S_{DAMP}$ are normally in the low impedance state in order to bypass the damping resistances $R_{DAMP}$, and the damping control signal 122 causes the switches $S_{DAMP}$ to open (high impedance state) to cause the DC link current to flow through the damping resistances $R_{DAMP}$. The signal 122 is provided by the damping controller 120 (e.g., FIGS. 1 and 2) as described above in response to detection/anticipation of grid fault occurrences and/or clearances.

Figure 8:
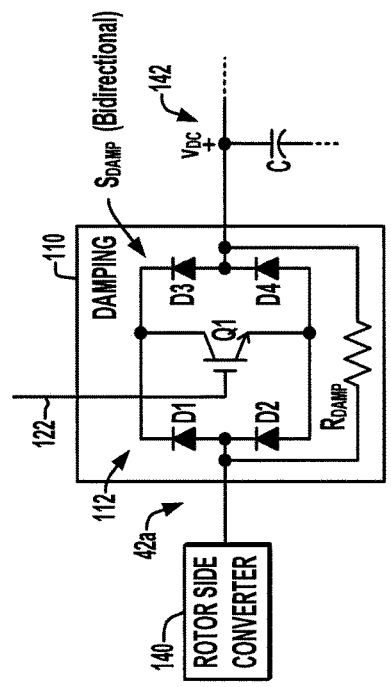
FIG. 8 is a schematic diagram illustrating an exemplary bidirectional damping circuit with a single IGBT and four diodes in parallel with a damping resistor for damping of a DC connection between the rotor side converter and the grid side converter.

FIG. 8 illustrates an exemplary damping apparatus 110 with a bidirectional switching device $S_{DAMP}$ including a single IGBT Q1 and four diodes D1-D4 generally as described above in connection with FIG. 6, where the switching device $S_{DAMP}$ is connected in parallel with a damping resistor $R_{DAMP}$ between the rotor side converter 140 and the capacitance C of the DC link 142.

FIG. 5 illustrates another DC damping embodiment in which the series damping apparatus 110 provides a damping circuit 112 with a resistance $R_{DAMP}$ and a parallel connected switching device $S_{DAMP}$ in only one of the DC bus lines. FIG. 5 illustrates a case in which the series damping apparatus 110 is connected in the upper (e.g., positive) DC bus line, but other embodiments are possible in which the series damping apparatus 110 is connected in the lower (e.g., negative) DC bus line.

Figure 9:
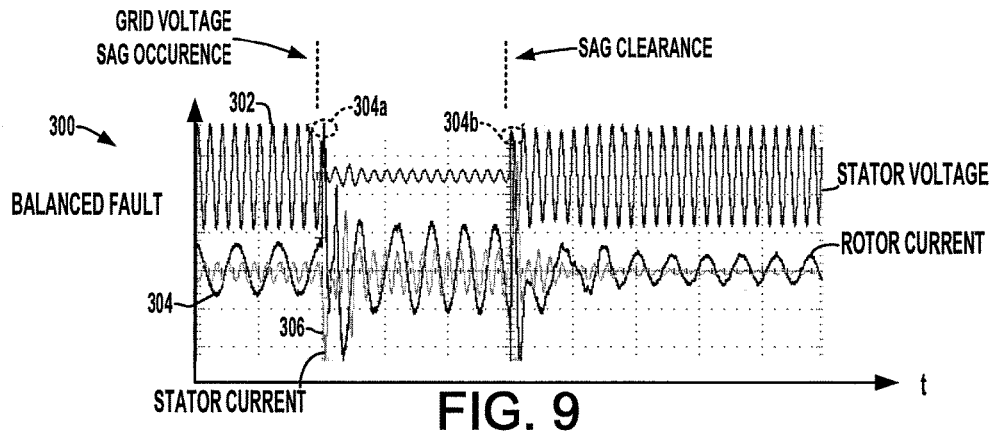
FIG. 9 is a graph illustrating various DFIG converter waveforms showing large rotor current spikes caused by balanced grid voltage sag fault occurrences and sag clearances in conventional DFIG converters.
Figure 10:
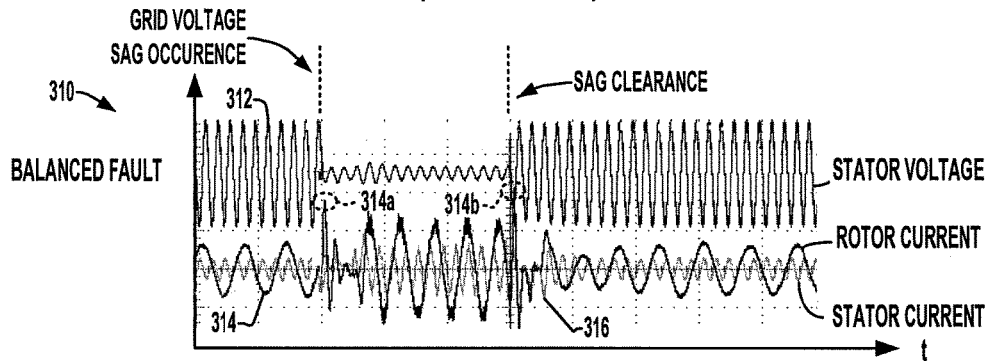
FIG. 10 is a graph illustrating DFIG converter waveforms showing reduction of rotor current spikes for balanced grid voltage sag fault occurrences and clearances in the DFIG converter of FIGS. 1 and 2.
Figure 11:
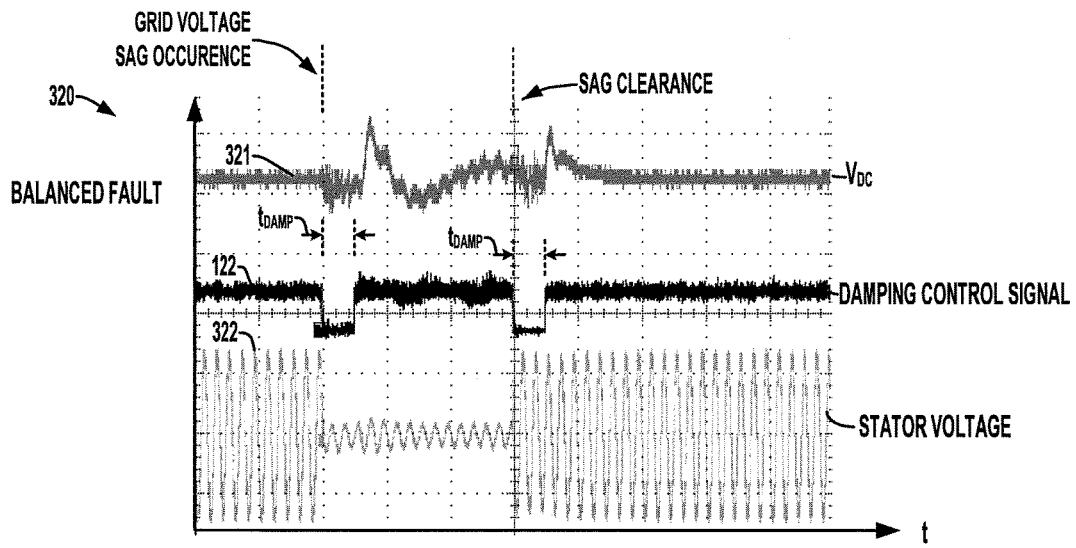
FIG. 11 is a graph illustrating DC link voltage and stator voltage waveforms in the DFIG converter of FIGS. 1 and 2 along with a damping control signal waveform in accordance with one or more aspects of the disclosure.

Referring to FIGS. 9-11, FIG. 9 illustrates a graph 300 showing stator voltage, rotor current and stator current DFIG converter waveforms 302, 304 and 306, respectively, in a conventional DFIG converter which does not employ the series damping concepts of the present disclosure. As seen in the graph 300, the rotor current 304 and stator current 306 have magnitudes related according to the number of rotor and stator winding turns in the DFIG 40. Upon the occurrence of a balanced grid voltage sag fault, the stator voltage 302 decreases significantly, the stator current 306 rises, and the rotor current 304 rises to a very large peak 304a, which can in some cases be about three times higher than the rated rotor current level. Similarly, upon clearance of the grid fault, the stator voltage 302 returns to its normal level, causing a spike in the stator current 306 as well as a very large spike 304b in the rotor current 304.

FIGS. 10 and 11 depict operation of the illustrated DFIG converter 100 for the same type of balanced fault in the grid 50. FIG. 10 shows a graph 310 illustrating stator voltage, voltage, rotor current and stator current waveforms 312, 314 and 316, respectively. As seen in FIG. 10, when the stator voltage 312 drops at the occurrence of a grid voltage sag fault, the rotor current 314 is subjected to a spike 314a, and also is subject to a spike 314b upon clearance of the sag fault, but the use of the series damping apparatus 110 actuated by the damping controller 120 as described above in response to both the grid fault occurrence and clearance significantly reduces the amplitude of the rotor current spikes 314a and 314b in comparison with those spikes 304a and 304b seen in the conventional case shown in FIG. 9.

A graph 320 in FIG. 11 illustrates DC bus voltage, damping control signal and stator voltage curves 321, 122 and 322, respectively, for the balanced fault condition depicted in FIG. 10. As noted above, when the damping controller 120 receives the fault detection signal 152 from the fault detector 150, the controller 120 provides the damping control signal 122 to the series damping apparatus 110, shown as an active-low damping control signal 122 in FIG. 11. As seen in the curve 321 of FIG. 11, moreover, the inclusion of the damping resistances $R_{DAMP}$ into the AC or DC lines coupled with the rotor side converter successfully damps the DC link current such that the fluctuations in the DC bus voltage $V_{DC}$ are attenuated while the damping control signal 122 is in the active low state. As previously discussed, in certain embodiments, the damping controller 120 maintains the series damping apparatus 110 in the second mode (damping state) for a time period $T_{DAMP}$ which may be constant. In other embodiments, the on time $T_{DAMP}$ of the damping control signal 122 is selectively adjusted according to one or more monitored operating parameters of the DFIG converter 100 (e.g., maintained until the stator current 316 reduces below a predetermined threshold in certain embodiments).

Figure 12:
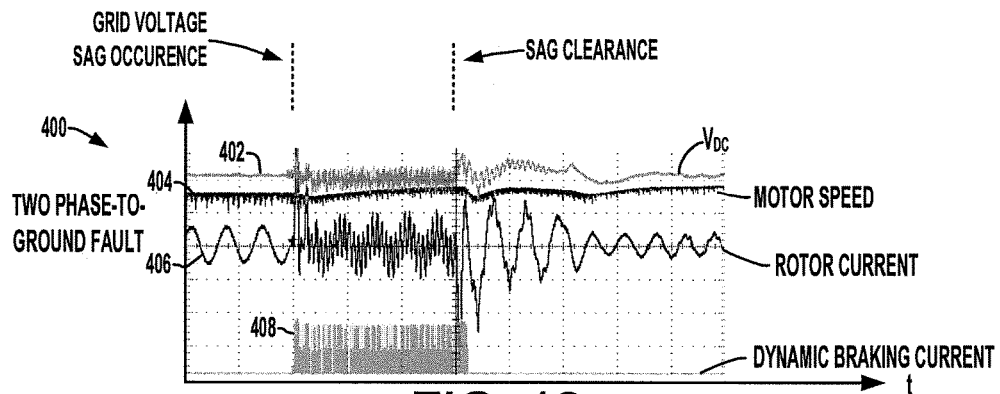
FIG. 12 is a graph illustrating various DFIG converter waveforms showing large rotor current spikes caused by dual phase-to-ground grid voltage sag fault occurrences and clearances in conventional DFIG converters.
Figure 13:
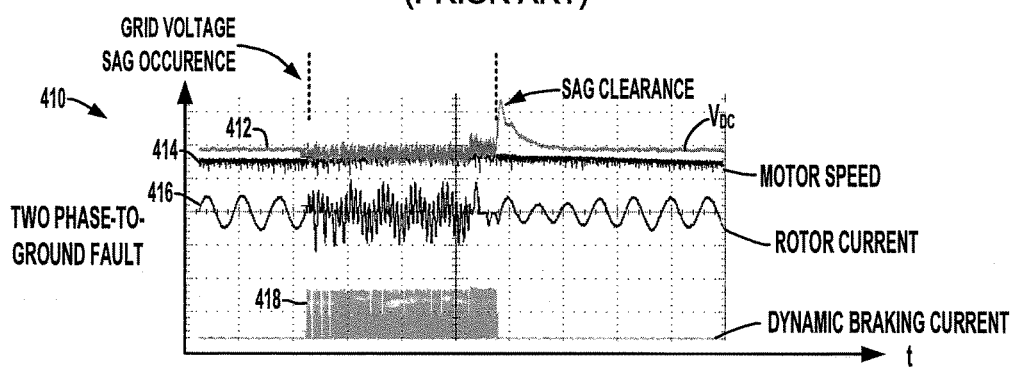
FIG. 13 is a graph illustrating DFIG converter waveforms showing reduced rotor current spikes for phase-to-ground grid voltage sag fault occurrences and clearances in the DFIG converter of FIGS. 1 and 2.
Figure 14:
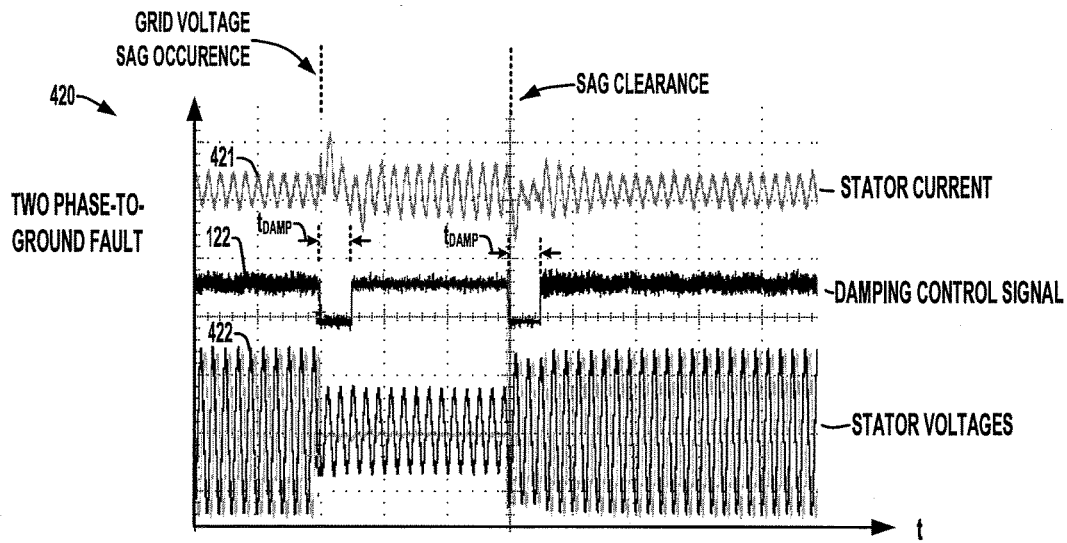
FIG. 14 is a graph illustrating stator current and voltage waveforms as well as a damping control signal waveform in the DFIG converter of FIGS. 1 and 2 for dual phase-to-ground fault occurrences and clearances in the DFIG converter of FIGS. 1 and 2.

FIGS. 12-14 illustrate conventional and series damped performance during grid faults involving two of the grid phases being shorted to ground. FIG. 12 shows a graph 400 illustrating DC bus voltage, motor speed, rotor current and dynamic braking current waveforms 402, 404, 406 and 408, respectively, in a conventional DFIG controller during such a fault condition. As seen in this graph 400, the rotor current 406 again suffers significantly high peaks or spikes upon the occurrence of the grid voltage sag and thereafter upon clearance of the sag.

FIG. 13 illustrates a graph 410 showing corresponding DC bus voltage, motor speed, rotor current and dynamic braking current waveforms 412, 414, 416 and 418 in the exemplary DFIG converter 100 having the series damping apparatus 110 and damping controller 120 as described above. As seen in the curve 416 of FIG. 13, the excursions of the rotor current 416 are significantly attenuated by the successful application of the series damping apparatus 110 to selectively insert the damping resistance(s) $R_{DAMP}$ into the AC or DC conduction path(s) coupled with the rotor side converter 140 as described above. FIG. 14 shows a graph 420 illustrating stator voltage and current waveforms 422, 421 along with the series damping control signal 122, which can have a fixed or adaptable on time $T_{DAMP}$ as described above.

Figure 15:
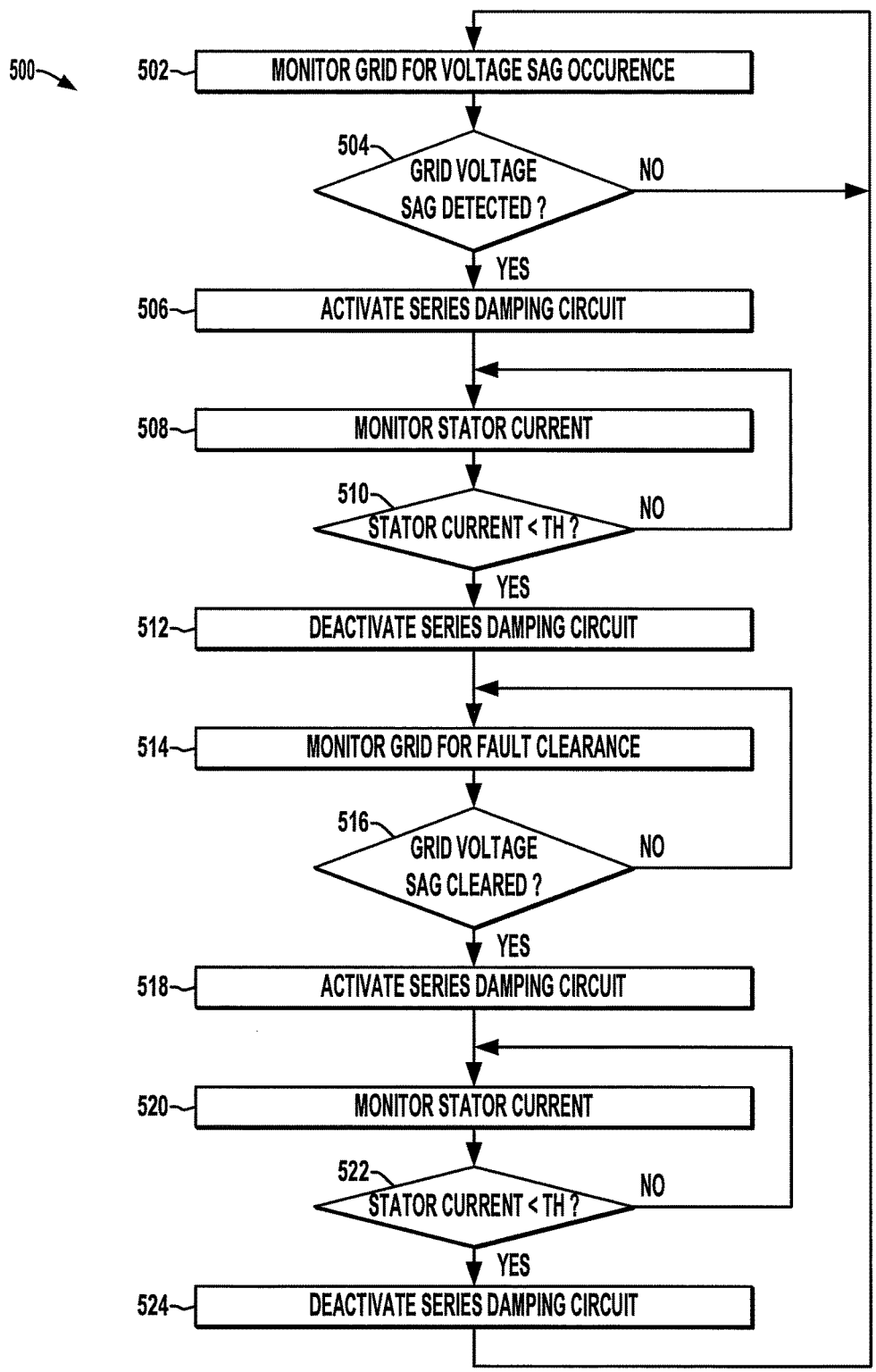
FIG. 15 is a flow diagram illustrating an exemplary method of operating a DFIG converter in accordance with further aspects of the disclosure.

Referring now to FIG. 15, a method 500 is illustrated for operating a DFIG converter (e.g. converter 100 above) in accordance with further aspects of the present disclosure. While the exemplary method 500 is illustrated and described below as a series of acts or events, the methods of the present disclosure are not limited by the illustrated ordering of such acts or events. For example, some acts may occur in different orders and/or concurrently with other acts or events apart from those illustrated and/or described herein, and not all illustrated steps may be required to implement a methodology in accordance with the disclosure.

At 502 in FIG. 15, the grid is monitored for voltage sag occurrences or other fault conditions, and a determination is made at 504 as to whether a grid voltage sag has been detected. If not (NO at 504), the grid monitoring continues at 502. Once a grid voltage sag (or other type of grid fault) is detected (YES at 504), a series damping circuit is activated at 506 in response to the detected fault occurrence. For instance, upon receipt of a signal 152 from the fault detector 150 indicating that a grid fault has been detected, the damping controller 120 described above provides a damping control signal 122 to the series damping apparatus 110 for activating the switching device(s) $S_{DAMP}$ to allow current flow through the damping resistance(s) $R_{DAMP}$ thereof. In certain embodiments, the series damping circuit 112 is held in the active state for a fixed time period, after which the damping circuit 112 may be deactivated. In the illustrated embodiment, the damping circuit 112 remains activated and the stator current or other operating conditions of the DFIG controller are monitored at 508. A determination is made at 510 as to whether the monitored stator current has decreased below a predetermined threshold. If not (NO at 510), the process 500 continues at 508 to monitor the stator current. Once the monitored stator current has decreased below the threshold (YES at 510), the series damping apparatus 110 is deactivated at 512. In this manner, the selective activation of the damping apparatus 110 can advantageously suppress or damp the current spikes in the rotor side converter 140 of the DFIG converter 100.

At 514 in FIG. 15, the grid is monitored for clearance of the previously detected fault. A determination is made at 516 as to whether the grid voltage sag has been cleared, and if not (NO at 516), the monitoring continues at 514. After the grid fault has been cleared (YES at 516), the series damping apparatus 110 is again activated at 518, and the stator current is monitored at 520. A determination is made at 522 as to whether the stator current has decreased below a predetermined threshold (which can be the same threshold used at 510 or which may be a different threshold value). If the stator current remains above the threshold (NO at 522), the stator current continues to be monitored at 520. Once the stator current drops below the threshold (YES at 522), the series damping apparatus is deactivated at 524, and the process 500 returns to 502 at which the grid is again monitored for the occurrence of one or more grid faults.

In accordance with further aspects of the present disclosure, a non-transitory, tangible computer readable medium is provided, such as a computer memory, a memory within a power converter control system (e.g., damping controller 120 and the various components of the DFIG converter 100 described above), a CD-ROM, floppy disk, flash drive, database, server, computer, etc.) which includes computer executable instructions for performing the above-described methods.

Circuit topologies and techniques are thus presented herein to facilitate suppression of current flowing through the rotor side converter 140 upon or in response to the occurrence and/or clearance of grid faults, whether detected or predicted. As mentioned above, although the apparatus 110, 120 and processes utilizing these series damping concepts have been illustrated and described in the context of a grid voltage sag, these concept can be advantageously employed in association with any other type of grid fault. In operation, these techniques advantageously insert additional damping resistance into one or more paths along which transient rotor voltage charges the capacitance C of the DC link bus 142, whether disposed between the rotor windings 42a and the AC connections R, S, T of the rotor side converter 140 and/or between the DC connections of the rotor side converter 140 and the DC link capacitance C. This selective inclusion of damping resistance can reduce the peak current levels previously associated with grid faults, particularly for DFIG architectures 40 having high turns ratio between the rotor 42 and the stator 44. The suppression of the voltage and current peaks in the rotor leads, in turn, reduces the likelihood of false triggering of overcurrent or overvoltage protection circuitry in the DFIG converter 100, thereby facilitating continued operation of the rotor side converter 140 so as to aid in propping up a faulted grid 50. In addition, the inclusion of the damping resistances can reduce the requirements on (or the need for) any included dynamic braking circuitry $Q_{DB}$, $R_{DB}$, $D_{DB}$, etc. and associated controls 170.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method of operating a converter for a double fed induction generator (DFIG), the converter including a rotor side converter comprising a plurality of rotor side AC connections, a first damping circuit including a first damping resistor with a first terminal connected to a first rotor side AC connection of the rotor side converter and a second terminal connected to a first rotor lead of the DFIG, the first damping circuit including a first damping switching circuit connected in parallel with the first damping resistor, the first damping switching circuit including a first terminal connected to the first terminal of the first damping resistor and a second terminal connected to the second terminal of the first damping resistor, the converter further including a plurality of rotor side DC connections coupled with a DC circuit, and a grid side converter comprising a plurality of grid side DC connections coupled with the DC circuit and a plurality of grid side AC connections coupleable to stator leads of the DFIG, the method comprising:
selectively activating the first damping circuit to conduct current through the first damping resistor between the first rotor lead and the first rotor side AC connection in response to a grid fault occurrence or a grid fault clearance; and
selectively bypassing the first damping resistor to prevent current flow in the first damping resistor a time period after activating the damping circuit.

2. The method of claim 1, further comprising monitoring at least one operating condition of the DFIG and adjusting the time period based at least partially on the at least one operating condition of the DFIG.

3. The method of claim 2, wherein selectively activating the first damping circuit comprises conducting AC current through the first damping resistor in response to the grid fault occurrence or the grid fault clearance.

4. The method of claim 1, comprising providing a control signal to activate the first damping circuit for a fixed time in response to the grid fault occurrence or in response to the grid fault clearance.

5. The method of claim 4, wherein selectively activating the first damping circuit comprises conducting AC current through the first damping resistor in response to the grid fault occurrence or the grid fault clearance.

6. The method of claim 1, wherein selectively activating the damping circuit comprises conducting AC current through the first damping resistor in response to the grid fault occurrence or the grid fault clearance.

7. The method of claim 6, wherein the first damping circuit is bidirectional.

8. The method of claim 1, wherein the first damping circuit is bidirectional.

9. A method of operating a converter for a double fed induction generator (DFIG), the converter including a rotor side converter comprising a plurality of rotor side AC connections and a plurality of rotor side DC connections coupled with a DC circuit including a DC bus capacitor connected to a first DC node, a first damping circuit including a first damping resistor with a first terminal connected to a first rotor side DC connection of the rotor side converter and a second terminal connected to the first DC node of the DC circuit, the first damping circuit including a first damping switching circuit connected in parallel with the first damping resistor, the first damping switching circuit including a first terminal connected to the first terminal of the first damping resistor and a second terminal connected to the second terminal of the first damping resistor, the converter further including a grid side converter comprising a plurality of grid side DC connections coupled with the DC circuit and a plurality of grid side AC connections coupleable to stator leads of the DFIG, the method comprising:
selectively activating the first damping circuit to conduct current through the first damping resistor between the first DC node of the DC circuit and the first rotor side DC connection in response to a grid fault occurrence or a grid fault clearance; and
selectively bypassing the first damping resistor to prevent current flow in the first damping resistor a time period after activating the damping circuit;
wherein selectively activating the damping circuit comprises conducting DC current through the first damping resistor in response to the grid fault occurrence or the grid fault clearance.

10. The method of claim 9, further comprising monitoring at least one operating condition of the DFIG and adjusting the time period based at least partially on the at least one operating condition of the DFIG.

11. The method of claim 9, comprising providing a control signal to activate the first damping circuit for a fixed time in response to the grid fault occurrence or in response to the grid fault clearance.

12. The method of claim 9, wherein the first damping circuit is bidirectional.

13. A non-transitory computer readable medium comprising computer executable instructions for operating a converter for a double fed induction generator (DFIG), the converter including a rotor side converter comprising a plurality of rotor side AC connections coupleable to rotor leads of the DFIG and a plurality of rotor side DC connections coupled with a DC circuit, and a grid side converter comprising a plurality of grid side DC connections coupled with the DC circuit and a plurality of grid side AC connections coupleable to stator leads of the DFIG, the converter including a rotor side converter comprising a plurality of rotor side AC connections, a first damping circuit including a first damping resistor with a first terminal connected to a first rotor side AC connection of the rotor side converter and a second terminal connected to a first rotor lead of the DFIG, the first damping circuit including a first damping switching circuit connected in parallel with the first damping resistor, the first damping switching circuit including a first terminal connected to the first terminal of the first damping resistor and a second terminal connected to the second terminal of the first damping resistor, the converter further including a plurality of rotor side DC connections coupled with a DC circuit, and a grid side converter comprising a plurality of grid side DC connections coupled with the DC circuit and a plurality of grid side AC connections coupleable to stator leads of the DFIG, the computer readable medium comprising computer executable instructions for:

selectively activating the first damping circuit to conduct current through the first damping resistor between the first rotor lead and the first rotor side AC connection in response to a grid fault occurrence or a grid fault clearance; and selectively bypassing the first damping resistor to prevent current flow in the first damping resistor a time period after activating the damping circuit.

14. The non-transitory computer readable medium of claim 13, further comprising computer executable instructions for monitoring at least one operating condition of the DFIG and adjusting the time period based at least partially on the at least one operating condition of the DFIG.

15. The non-transitory computer readable medium of claim 13, further comprising computer executable instructions for providing a control signal to activate the first damping circuit for a fixed time in response to the grid fault occurrence or in response to the grid fault clearance.

16. The non-transitory computer readable medium of claim 15, further comprising computer executable instructions for conducting AC current through the first damping resistor in response to the grid fault occurrence or the grid fault clearance.

17. The non-transitory computer readable medium of claim 13, further comprising computer executable instructions for conducting AC current through the damping resistance coupled in series between the rotor lead of the rotor and one of the rotor side AC connections of the rotor side converter in response to the grid fault occurrence or the grid fault clearance.

18. The non-transitory computer readable medium of claim 13, wherein the first damping circuit is bidirectional.

\* \* \* \* \*